US010138304B2

(12) United States Patent
Huang et al.

(10) Patent No.: US 10,138,304 B2
(45) Date of Patent: Nov. 27, 2018

(54) **METHODS FOR INCREASING THE EXTRACTABLE RUBBER CONTENT OF NON-*HEVEA* PLANT MATTER**

(71) Applicant: Bridgestone Corporation, Tokyo (JP)

(72) Inventors: Yingyi Huang, Hudson, OH (US); Mark W. Smale, Hudson, OH (US)

(73) Assignee: Bridgestone Corporation, Tokyo (JP)

( * ) Notice: Subject to any disclaimer, the term of this patent is extended or adjusted under 35 U.S.C. 154(b) by 905 days.

(21) Appl. No.: 14/409,124

(22) PCT Filed: Jun. 18, 2013

(86) PCT No.: PCT/US2013/046380
§ 371 (c)(1),
(2) Date: Dec. 18, 2014

(87) PCT Pub. No.: WO2013/192217
PCT Pub. Date: Dec. 27, 2013

(65) Prior Publication Data
US 2015/0136882 A1     May 21, 2015

Related U.S. Application Data

(60) Provisional application No. 61/661,033, filed on Jun. 18, 2012.

(51) Int. Cl.
| | | |
|---|---|---|
| *C08C 2/00* | (2006.01) | |
| *B02C 4/02* | (2006.01) | |
| *B02C 13/04* | (2006.01) | |
| *C08C 3/00* | (2006.01) | |
| *B02C 4/30* | (2006.01) | |
| *B02C 21/00* | (2006.01) | |
| *B02C 23/08* | (2006.01) | |
| *C08C 1/00* | (2006.01) | |

(52) U.S. Cl.
CPC ............ *C08C 2/00* (2013.01); *B02C 4/02* (2013.01); *B02C 4/30* (2013.01); *B02C 13/04* (2013.01); *B02C 21/00* (2013.01); *B02C 23/08* (2013.01); *C08C 1/00* (2013.01); *C08C 3/00* (2013.01)

(58) Field of Classification Search
CPC .... C08C 2/00; C08C 1/00; C08C 3/00; B02C 23/08; B02C 23/00; B02C 23/04; B02C 23/14; B02C 4/02; B02C 4/30; B02C 13/04; B02C 21/00
USPC ........................................................ 214/20
See application file for complete search history.

(56) References Cited

U.S. PATENT DOCUMENTS

| | | |
|---|---|---|
| 702,678 A | 2/1902 | Prampolini |
| 741,258 A | 10/1903 | Lawrence |
| 814,407 A | 3/1906 | Von Stechow |
| 843,567 A | 2/1907 | Bradshaw |
| 957,495 A | 3/1909 | Chute et al. |
| 979,902 A | 9/1910 | Van der Linde |
| 999,493 A | 8/1911 | Ellis |
| 999,708 A | 8/1911 | Ellis |
| 1,003,139 A | 9/1911 | Kelley |
| 1,007,681 A | 11/1911 | Ellis |
| 1,051,987 A | 2/1913 | Chute |
| 1,103,903 A | 7/1914 | Kendall |
| 1,105,568 A | 7/1914 | Kendall |
| 1,135,236 A | 4/1915 | Wheeler et al. |
| 1,161,135 A | 11/1915 | Kaminski et al. |
| 1,167,264 A | 1/1916 | Brooks |
| 1,189,549 A | 1/1916 | Ellis |
| 1,189,550 A | 7/1916 | Ellis |
| 1,242,886 A | 10/1917 | Meyer |
| 1,247,814 A | 11/1917 | Garza |
| 1,550,319 A | 8/1925 | Hopkinson |
| 1,671,570 A | 5/1928 | Carnahan |
| 1,695,676 A | 12/1928 | Yeandle |
| 1,735,835 A | 11/1929 | Mccallum |
| 1,740,079 A | 11/1929 | Edison |
| 1,753,184 A | 4/1930 | Spence |
| 1,753,185 A | 4/1930 | Spence |
| 1,989,502 A | 10/1931 | Calcott et al. |
| 1,833,287 A | 11/1931 | Hadley |

(Continued)

FOREIGN PATENT DOCUMENTS

| | | |
|---|---|---|
| AU | 2012202924 A1 | 6/2012 |
| CN | 1442193 A1 | 4/2003 |

(Continued)

OTHER PUBLICATIONS

Invitation pursuant to article 94(3) and rule 71(1) EPC dated Feb. 13, 2013.
Response to European Office Action dated Sep. 20, 2012.
Response to the Extended European Search Report dated Mar. 8, 2012.
International Search Report for WO 2013/134430 (PCT/US2013/029451) Kim, Dong Seok, dated Jun. 21, 2013.
International Preliminary Report on Patentability for WO 2013/134430 (PCT/US2013/029451) Kim, Dong Seok, dated Sep. 9, 2014.

(Continued)

*Primary Examiner* — Jessica Cahill
*Assistant Examiner* — Smith O Bapthelus
(74) *Attorney, Agent, or Firm* — Meredith E. Hooker; Jenny L. Sheaffer

(57) ABSTRACT

Methods for increasing the extractable rubber content of non-*Hevea* plant matter that entail the use of particular forms of hammer milling and/or roller milling in an increase in the amount of rubber that can be extracted from the resulting plant matter such as by organic solvent extraction or aqueous extraction are provided. In certain embodiments, the methods are for increasing the extractable rubber content of guayule plant matter, and entail the use of particular forms of hammer milling in combination with roller milling and flaking to increase the amount of rubber that can be extracted from the guayule plant matter such as by organic solvent extraction or aqueous extraction.

20 Claims, No Drawings

(56) References Cited

U.S. PATENT DOCUMENTS

| | | |
|---|---|---|
| 1,903,500 A | 4/1933 | Calcott |
| 2,138,895 A | 12/1938 | Wiezevich |
| 2,187,146 A | 1/1940 | Calcott et al. |
| 2,281,336 A | 4/1942 | Stacom |
| 2,339,418 A * | 1/1944 | McKay .................. A23L 7/115 |
| | | 426/103 |
| 2,364,394 A | 12/1944 | Sibley |
| 2,373,689 A | 4/1945 | Kenda |
| 2,387,521 A | 10/1945 | Martin |
| 2,390,860 A | 12/1945 | Williams |
| 2,399,156 A | 4/1946 | Stamberger et al. |
| 2,408,853 A | 10/1946 | Hoover et al. |
| 2,410,780 A | 11/1946 | Gracia et al. |
| 2,410,781 A | 11/1946 | Gracia et al. |
| 2,425,011 A | 8/1947 | Smith |
| 2,434,412 A | 1/1948 | Jones |
| 2,459,369 A | 1/1949 | Tint et al. |
| 2,475,141 A | 7/1949 | Jones |
| 2,522,136 A | 9/1950 | Schaffer |
| 2,549,763 A | 4/1951 | Banigan, Jr. et al. |
| 2,572,046 A | 10/1951 | Meeks et al. |
| 2,665,317 A | 11/1951 | Clark |
| 2,618,670 A | 11/1952 | Clark |
| 2,744,125 A | 5/1956 | Meeks et al. |
| 3,141,281 A | 7/1964 | Guant et al. |
| 3,311,601 A | 3/1967 | Batts |
| 3,376,158 A | 4/1968 | Buser |
| 4,107,902 A | 8/1978 | Suggs |
| 4,122,012 A | 10/1978 | Blasnik |
| 4,136,131 A * | 1/1979 | Buchanan ................. C08C 4/00 |
| | | 524/926 |
| 4,159,903 A | 7/1979 | Bauman |
| 4,198,324 A | 4/1980 | Lal et al. |
| 4,243,561 A | 1/1981 | Lal et al. |
| 4,246,001 A | 1/1981 | Bauman |
| 4,269,242 A | 5/1981 | Smith et al. |
| 4,272,436 A | 6/1981 | Lal et al. |
| 4,363,188 A | 12/1982 | Lovelace et al. |
| 4,376,189 A | 3/1983 | Trivette, Jr. |
| 4,376,835 A | 3/1983 | Schmitt et al. |
| 4,376,853 A | 3/1983 | Gutierrez et al. |
| 4,405,532 A | 9/1983 | Gutierrez et al. |
| 4,410,656 A | 10/1983 | Coran et al. |
| 4,412,031 A | 10/1983 | Kitahara et al. |
| 4,412,041 A | 10/1983 | Kitahara et al. |
| 4,424,171 A | 1/1984 | Gutierrez et al. |
| 4,433,114 A | 2/1984 | Coran et al. |
| 4,434,266 A | 2/1984 | Trivette, Jr. |
| 4,435,337 A | 3/1984 | Kay et al. |
| 4,493,925 A | 1/1985 | Trivette, Jr. |
| 4,496,683 A | 1/1985 | Morita |
| 4,499,243 A | 2/1985 | Rader |
| 4,513,110 A | 4/1985 | Rader |
| 4,525,541 A | 6/1985 | Kitahara et al. |
| 4,526,929 A | 7/1985 | Kishida et al. |
| 4,526,959 A | 7/1985 | Kay et al. |
| 4,530,995 A | 7/1985 | Gutierrez et al. |
| 4,542,191 A | 9/1985 | Kay et al. |
| 4,557,306 A | 12/1985 | Graves |
| 4,559,378 A | 12/1985 | Kay et al. |
| 4,568,711 A | 2/1986 | Kay et al. |
| 4,570,690 A | 2/1986 | Graves |
| 4,585,826 A | 4/1986 | Graves |
| 4,591,631 A * | 5/1986 | Beattie .................. C09F 1/00 |
| | | 528/493 |
| 4,591,632 A | 5/1986 | Moore |
| 4,609,336 A | 9/1986 | Stevenson et al. |
| 4,616,068 A | 10/1986 | Schlomann, Jr. et al. |
| 4,616,075 A | 10/1986 | Malani et al. |
| 4,621,118 A | 11/1986 | Schlomann, Jr. et al. |
| 4,622,365 A | 11/1986 | Schlomann, Jr. et al. |
| 4,623,713 A | 11/1986 | Beinor et al. |
| 4,638,028 A | 1/1987 | Lui et al. |
| 4,647,607 A | 3/1987 | Kay et al. |
| 4,677,153 A | 6/1987 | Kitahara et al. |
| 4,678,860 A | 7/1987 | Kuester |
| 4,681,929 A | 7/1987 | Cole et al. |
| 4,684,715 A | 8/1987 | Kay et al. |
| 4,687,810 A | 8/1987 | Coran |
| 4,728,343 A | 3/1988 | Snyder |
| 4,739,037 A * | 4/1988 | Kay ........................ C09F 1/00 |
| | | 528/493 |
| 4,739,038 A | 4/1988 | Schlomann, Jr. |
| 4,751,271 A | 6/1988 | Graves |
| 4,761,446 A | 8/1988 | Graves et al. |
| 4,762,870 A | 8/1988 | Graves et al. |
| 4,778,857 A | 10/1988 | Graves et al. |
| 4,786,683 A | 11/1988 | Schlomann, Jr. et al. |
| 4,792,583 A | 12/1988 | Coran |
| 4,804,741 A * | 2/1989 | Verbiscar .................. C08C 2/06 |
| | | 528/503 |
| 4,822,845 A | 4/1989 | Graves et al. |
| 4,829,117 A | 5/1989 | Schlomann, Jr. et al. |
| 4,927,887 A | 5/1990 | Tate et al. |
| 4,975,497 A | 12/1990 | Tate et al. |
| 4,983,729 A | 1/1991 | Sikora |
| 4,988,388 A | 1/1991 | Schloman, Jr. |
| 5,247,009 A | 9/1993 | Kitahara |
| 5,272,203 A | 12/1993 | Joyner et al. |
| 5,306,862 A | 4/1994 | Cappell et al. |
| 5,321,111 A | 6/1994 | Ji |
| 5,362,807 A | 11/1994 | Nogura et al. |
| 5,379,948 A * | 1/1995 | Teppo ....................... B02C 4/08 |
| | | 241/23 |
| 5,453,051 A * | 9/1995 | Schlough ............... A01D 45/02 |
| | | 460/113 |
| 5,468,539 A * | 11/1995 | Crivelli ............... B29B 17/0042 |
| | | 404/32 |
| 5,473,024 A | 12/1995 | Thames et al. |
| 5,580,942 A | 12/1996 | Cornish |
| 5,599,868 A | 2/1997 | Bohm et al. |
| 5,616,075 A | 4/1997 | Winstanley et al. |
| 5,633,433 A | 5/1997 | Backhaus et al. |
| 5,645,234 A | 7/1997 | Del Zotto |
| 5,651,953 A | 7/1997 | Yokohama et al. |
| 5,717,050 A | 2/1998 | Cornish |
| 5,872,186 A | 2/1999 | Ang |
| 5,998,512 A | 12/1999 | Schloman, Jr. |
| 6,014,998 A | 1/2000 | Mowdood et al. |
| 6,054,525 A | 4/2000 | Schloman, Jr. |
| 6,132,711 A | 11/2000 | Backhaus et al. |
| 6,231,970 B1 | 5/2001 | Andersen et al. |
| 6,382,425 B1 | 5/2002 | Brickner et al. |
| 6,399,673 B1 | 6/2002 | Thames et al. |
| 6,482,884 B1 | 11/2002 | Schaal et al. |
| 6,492,447 B2 * | 12/2002 | Chestnutt .................. C08C 1/14 |
| | | 524/157 |
| 6,645,747 B1 | 11/2003 | Hallahan et al. |
| 6,726,025 B1 | 4/2004 | Huskey |
| 6,734,245 B2 | 5/2004 | Baranek |
| 6,787,590 B2 | 9/2004 | Nakayama et al. |
| 6,816,876 B2 | 11/2004 | Koffler et al. |
| 6,818,676 B2 | 11/2004 | Koffler et al. |
| 7,026,678 B2 | 4/2006 | Coursey |
| 7,205,456 B2 | 4/2007 | Hallahan et al. |
| 7,259,231 B2 | 8/2007 | Cornish et al. |
| 7,540,438 B2 | 6/2009 | Buranov |
| 7,629,397 B2 | 12/2009 | McDonald et al. |
| 7,790,036 B2 | 9/2010 | Cornish et al. |
| 7,923,039 B2 | 4/2011 | Cornish et al. |
| 7,955,611 B2 | 6/2011 | Brown et al. |
| 8,013,213 B2 | 9/2011 | Mau et al. |
| 8,080,358 B2 | 12/2011 | Murakami |
| 8,241,873 B2 | 8/2012 | Diner et al. |
| 8,268,121 B2 | 9/2012 | Blount |
| 8,815,965 B2 * | 8/2014 | Cole ........................ C08C 1/02 |
| | | 521/44.5 |
| 9,138,660 B2 | 9/2015 | Yamamoto |
| 9,315,589 B2 | 4/2016 | Huang et al. |
| 9,328,211 B2 | 5/2016 | Nemato et al. |
| 9,546,224 B2 | 1/2017 | Cole et al. |
| 9,562,720 B2 | 2/2017 | Huang et al. |
| 9,567,457 B2 | 2/2017 | Huang et al. |
| 9,611,334 B2 | 4/2017 | Huang et al. |

(56) References Cited

U.S. PATENT DOCUMENTS

| | | |
|---|---|---|
| 9,637,562 B2 | 5/2017 | Huang et al. |
| 9,890,262 B2 | 2/2018 | Huang et al. |
| 2002/0006987 A1 | 1/2002 | Nakayama |
| 2004/0265343 A1 | 12/2004 | Hill |
| 2005/0011812 A1 | 1/2005 | Nelson |
| 2005/0050759 A1 | 3/2005 | Chandran et al. |
| 2006/0070167 A1 | 4/2006 | Eng et al. |
| 2006/0106138 A1 | 5/2006 | Cornish et al. |
| 2006/0106183 A1 | 5/2006 | Cornish et al. |
| 2006/0149015 A1 | 7/2006 | Cornish et al. |
| 2006/0217512 A1 | 9/2006 | Mau et al. |
| 2006/0218660 A1 | 9/2006 | Dong et al. |
| 2006/0226144 A1 | 10/2006 | Hallahan et al. |
| 2007/0265408 A1 | 11/2007 | Cornish et al. |
| 2007/0276112 A1* | 11/2007 | Buranov .................. C08C 3/00 528/1 |
| 2008/0015336 A1 | 1/2008 | Cornish et al. |
| 2008/0172998 A1 | 1/2008 | Fraley et al. |
| 2008/0221246 A1 | 9/2008 | Imam et al. |
| 2008/0300526 A1 | 12/2008 | Gumbs |
| 2009/0054595 A1 | 2/2009 | Cornish et al. |
| 2009/0099309 A1 | 4/2009 | Gumbs |
| 2009/0099327 A1 | 4/2009 | Cornish et al. |
| 2009/0163689 A1 | 6/2009 | Cornish et al. |
| 2009/0191243 A9 | 7/2009 | Hill et al. |
| 2009/0199425 A1 | 8/2009 | Taylor |
| 2011/0021743 A1 | 1/2011 | Cornish et al. |
| 2011/0054051 A1 | 3/2011 | Cole et al. |
| 2011/0275142 A1 | 11/2011 | Wade et al. |
| 2014/0336288 A1 | 11/2014 | Cole et al. |
| 2015/0073113 A1 | 3/2015 | Huang et al. |
| 2015/0126673 A1 | 5/2015 | Randall et al. |
| 2015/0136882 A1 | 5/2015 | Huang et al. |
| 2015/0184933 A1 | 7/2015 | Huang et al. |
| 2015/0190848 A1 | 7/2015 | Huang et al. |
| 2017/0081429 A1 | 5/2017 | Cole et al. |
| 2017/0146291 A1 | 5/2017 | Huang et al. |
| 2017/0152326 A1 | 6/2017 | Huang et al. |
| 2017/0226309 A1 | 8/2017 | Huang et al. |

FOREIGN PATENT DOCUMENTS

| | | |
|---|---|---|
| CN | 1860850 A | 11/2006 |
| CN | 101671404 A | 3/2010 |
| CN | 101906176 A1 | 12/2010 |
| EA | 2011170418 A1 | 12/2011 |
| EP | 87109 | 8/1983 |
| EP | 100434 | 2/1984 |
| EP | 105822 | 4/1984 |
| EP | 0164137 A2 | 12/1985 |
| EP | 179211 A1 | 4/1986 |
| EP | 180716 A1 | 5/1986 |
| EP | 87109 B2 | 10/1986 |
| EP | 0039910 B1 | 4/1987 |
| EP | 105822 B1 | 6/1988 |
| EP | 180716 B1 | 4/1989 |
| EP | 179211 B1 | 7/1989 |
| EP | 100434 B1 | 9/1989 |
| EP | 0164137 B1 | 6/1990 |
| EP | 509768 A2 | 10/1992 |
| EP | 491229 B1 | 5/1995 |
| EP | 675202 A1 | 10/1995 |
| EP | 476641 B1 | 11/1995 |
| EP | 938350 B1 | 9/1999 |
| EP | 1752277 A2 | 2/2007 |
| EP | 2183303 A1 | 5/2010 |
| EP | 1969036 B1 | 3/2011 |
| GB | 545410 A | 5/1942 |
| GB | 2164341 A | 9/1984 |
| GB | 2174403 A | 11/1986 |
| JP | S61264005 A | 11/1986 |
| JP | 62000502 A | 1/1987 |
| JP | H06100704 | 4/1994 |
| JP | H08283309 | 10/1996 |
| JP | H1112306 A | 6/1997 |
| JP | 11012306 A | 1/1999 |
| JP | H11-12036 A | 1/1999 |
| JP | 2003040902 A | 2/2003 |
| JP | 2003313366 A | 11/2003 |
| JP | 2006348067 | 12/2006 |
| JP | 2007126676 A | 5/2007 |
| JP | 2007224067 | 9/2007 |
| RU | 2027746 C1 | 1/1995 |
| SU | 15590 A1 | 6/1930 |
| SU | 47819 A1 | 7/1936 |
| SU | 47820 A1 | 7/1936 |
| SU | 50447 A1 | 11/1936 |
| SU | 66332 A1 | 11/1945 |
| SU | 72175 A1 | 11/1947 |
| WO | 1981003255 | 11/1981 |
| WO | 9803255 A1 | 1/1998 |
| WO | 2001010946 A2 | 2/2001 |
| WO | 2001049257 | 12/2001 |
| WO | 2009054595 A1 | 4/2009 |
| WO | 2009095059 A1 | 8/2009 |
| WO | 2009129249 A3 | 10/2009 |
| WO | 2013-134430 A1 | 9/2013 |
| WO | 2013134429 A1 | 9/2013 |
| WO | 2013-173625 A1 | 11/2013 |
| WO | 2013192182 A1 | 12/2013 |
| WO | 2013192217 A1 | 12/2013 |
| WO | 2013192227 A1 | 12/2013 |
| WO | 2015038707 A1 | 3/2015 |

OTHER PUBLICATIONS

International Search Report for WO 2013/134429 (PCT/US2013/029449) Athina Nickitas-Etienne, dated Sep. 9, 2014.
International Preliminary Report on Patentability for WO 2013/134429 (PCT/US2013/029449) Athina Nickitas-Etienne, dated Sep. 9, 2014.
International Search Report for WO 2013/173625 (PCT/US2013/041422) Kim, Dong Seok, dated Aug. 5, 2013.
International Preliminary Report on Patentability for WO 2013/173625 (PCT/US2013/041422) Lindner, Nora, dated Nov. 18, 2014.
Third Party Objection for WO 2013/173625 (PCT/US2013/041422) Anonymous, dated Aug. 6, 2014.
Buranov, A. et al., Rubber-bearing plants of Central Asia. Industrial Crops and Rural Development, AAIC and Imida, Murcia, Spain. (Sep. 17, 2005).
Jordi Labs, Polymer Solubility Index. Accessed at http://www.lifescience.ca/data/catalogue/211~v~Polymer_Solubility_Index.pdf on May 8, 2014.
Schloman W. W. Jr. Processing Guayule for Latex and Bulk Rubber. Indust. Crops and Products. 22 (1) pp. 41-47 (2005).
International Search Report for WO 2013/192227 (PCT/US2013/046409) Heo, Joo Hyung, dated Oct. 16, 2013.
International Preliminary Report on Patentability for WO 2013/192227 (PCT/US2013/046409) Bai, Lingfei, dated Dec. 23, 2014.
International Search Report for WO 2013/192182 (PCT/US2013/046328) Kim, Dong Seok, dated Oct. 11, 2013.
International Preliminary Report on Patentability for WO 2013/192182 (PCT/US2013/046328) Lindner, Nora, dated Dec. 23, 2014.
International Search Report for WO 2013/192217 (PCT/US2013/046380) Kim, Dong Seok, dated Oct. 11, 2013.
International Preliminary Report on Patentability for WO 2013/192217 (PCT/US2013/046380) Bécamel, Philippe, dated Dec. 23, 2014.
Office Action issued in application No. CN201380031854, dated Sep. 11, 2015.
Office Action issued in application No. CN201380023740.0, dated May 26, 2015.
Office Action issued in application No. CN2013-80021313.9, dated Jun. 2, 2015.
Office Action issued in application No. CN2013-80021313.9, dated Nov. 3, 2015.
Extended European Search Report issued in application No. EP13758291.2, dated Oct. 26, 2015.

(56) References Cited

OTHER PUBLICATIONS

Extended European Search Report issued in application No. EP13757665.5, dated Oct. 26, 2015.
Office Action issued in application No. CN2013-80032056.9, dated Sep. 6, 2015.
Office Action issued in application No. CN2013-80032039.5, dated Sep. 1, 2015.
Office Action issued in application No. CN2013-80031854.X, Sep. 11, 2015.
Office action dated Dec. 11, 2012 in U.S. Appl. No. 14/338,581.
Office action dated May 31, 2013 in U.S. Appl. No. 14/338,581.
Office action dated Nov. 13, 2013 in U.S. Appl. No. 14/338,581.
Office action dated May 13, 2013 in U.S. Appl. No. 14/338,581.
Response and RCE filed Oct. 30, 2013 in U.S. Appl. No. 14/338,581.
Response filed Mar. 31, 2014 in U.S. Appl. No. 14/338,581.
Supplemental European Search Report in EP national stage from PCT/US2013/209451 dated Oct. 26, 2015.
Supplemental European Search Report in EP national stage from PCT/US2013/029449 dated Oct. 26, 2015.
Office Action issued in application No. CN2015121101372770, dated Dec. 16, 2015.
Extended European Search Report issued in application No. EP13807611.2, dated Oct. 26, 2015.
Third party observations submitted in PCT/US2013/041422 on Nov. 21, 2014.
Schloman W. W. Jr. et al. Water Stress and Seasonal Effects on Rubber Quality in Irrigated Guayule, J. Agricultural and Food Chemistry v 34, pp. 683-685 (1986).
Schloman W. W. Jr. et al. Seasonal Effects on Guayule Resin Composition, J. Agricultural and Food Chemistry, v. 34 pp. 177-179 (1986).
T.R. Meeker; Specialty Isoprene Based Polymers—Derivatives from the General Purpose Polymers; Doc. 1848; Spring 1985.
Rubber Developments vol. 39 No. 1, pp. 23-24; Your Questions Answered (1986).
J. Brad Murphy and C.A. Stutte; Analysis for Substituted Benzoic and Cinnamic Acids Using High-Pressure Liquid Chromatography; Analytical Biochemistry 86, 220-28 (1978).
Himayah H. Naqvi and George P. Hanson; American Journal of Botany, vol. 69, No. 6 (Jul. 1982) pp. 985-989; Germination and Growth Inhibutors in Guayule Chaff and their Possible Influence in Seed Dormancy.
G.F. Touzinsky; Northern Regional Research Center; Agricultural Research, Science and Education Administration; Guayule as a Source of Papermaking Fiber, 5th International Dissolving Pulps Converence, Vienna, pp. 311-315 (1980).
Benedict, H.M. The Effect of Waste Products from the Guayule Rubber Mill on the Growth of Various Cros. J. American Society of Agronomy, vol. 40; pp. 1005-1016 (1948).
Bonner J. and A.W. Galston. Toxic Substances from the Culture Media of Guayule Which May Inhibit Growth. Botanical Gazelle, vol. 106; pp. 189-196 (1944).
Chang M. and G.T. Tsao. Hydrolysis of Guayule Cellulose for Alcohol Production. Proceedings of the Third International Guayule Conference, Pasadena, CA, Guayule Rubber Soc. pp. 211-224 (1983).
Gelling, I.R., Modification of Natural Rubber Latec with Peracetic Acid. Rubber Chemistry and Technology, vol. 58 pp. 86-96 (1985).
Keller, R.W., Winkler D.S., and Stephens, H.L.., Degradative Effects of Guayule Resin on Natural Rubber. Rubber Chemistry and Technology. vol. 54, pp. 115-123, (1981).
King, R.J. and Mondimore, D.M., HLPC Procedure for the determination of free sulfur in natural rubber fomulations. Rubber Chemistry and Technology, vol. 60 pp. 716-720 (1987).
Kuester et al. Liquid Hydrocarbon Fuel Potential of Agricultural Materials. International Conference of Fundamentals of Thermochemical Biomass Conversion, 1982, Elsevier Applied Science: London, pp. 875-895 (1985).
Sin Stew Weng, Some Traditional and New Uses of Skim Rubber, Rubber Res. Inst. Malaysia, Proceedings of RRIM Planters Conference (1981).
Van Rysselberge, J., Utilisation De Bitumes Elastomeres (1976).
ASTM International, Standard Test Methods for Rubber from Natural Sources—Chemical Analysis, D 1278, (2002), pp. 246-251.
Curtis Jr., Distribution of Rubber and Resins in Guayule. Plant Physiology, vol. 22, No. 4, Oct. 1947, pp. 333-359.
Doering. Guayule Rubber in Tires and Tubes, Service Tests in which the Rubber was Exclsively Guayule. Industrial and Engineering Chemistry, vol. 26 No. 5, pp. 541-543 (1934).
Makitra et al. Dependence of Natural Rubber Swelling Index Upon Organic Solvents Properties. Chemistry & Chemical Technology, vol. 5, No. 1, 2011, pp. 19-24.
McIntyre et al. Guayule Rubber. Handbook of Elastomers, pp. 1-27, 2001.
International preliminary report on patentability and written opinion (PCT/US2009/040543) Athina Nickitas-Etienne; dated Oct. 19, 2010 (8 Pages).
International Search Report (PCT/US2009/040543) Hyunk Seok Kang; dated Nov. 9, 2009 (2 Pages).
Extended Search Report EP09733501, dated Aug. 19, 2001.
EP 09733501 Communication Pursuant to Article 94(3) EPC, dated May 10, 2012.
First office action in Chinese Application No. 2009801224454 dated Mar. 27, 2012.
Second office Action in Chinese Application No. 2009801224454 dated Jun. 27, 2012.
Response to Australian Office Action dated Dec. 23, 2013.
Response to EPO dated Apr. 9, 2013.
Notification of Intent to Grant from EPO dated Jun. 12, 2013.
Decanters from GEA Westfalia Separator, Mechanical Separation, GEA Westfalia Separator, www.westfalia-separator.com (2010).
G.M. Bedane, M.L. Gupta, D.L. George. Development and Evaluation of a Guayule Debarker. Industrial Crops and Products. 34 (2011) 1256-1261. Elsevier.
R.J. Adler et al. Freeze Coagulation of ABS Latex. Ind. Eng. Chem. Res. 36 (1997), pp. 2156-2162.
Bhowmick et al. Effect of Resin Components on the Degradation of Guayule Rubber. J. App. Polymer Science. vol. 30, 236702388 (1985).
Cataldo F. Guayule Rubber: A New Possible World Scenario for the Production of Natural Rubber. Progress in Rubber and Plastics Technology. vol. 16, No. 1, 2000.
Tanaka, Y. Structural Characterization of Natural Polyisoprenes: Solve the Mystery of Natural Rubber Based on Structural Study. Rubber Chemistry and Technology. vol. 74, 355, 2001.
Centrifugation and centrifuges, lenntech. Accessed Dec. 6, 2011 at http://www.lenntech.com/library/clarification/centrifugation.htm.
Extraction Decanters From Gea Wesffalia Separator, GEA Westfalia Separator Group. Accessed: May 30, 2012 at http://www/westfalia-separator.com/products/decanters/extraction-decanters.html.
Crown Model IV and Model V Extractors, Flyer, Crown Iron Works Company. Accessed Jul. 30, 2015 at http://www.crowniron.com/userfiles/image/specialty%20extractor%20insert1.pdf.
Screw press, wikipedia. Accessed May 28, 2012 at http://en.wikipedia.org/wiki/screw_press.
Biosolids Dewatering, Promotional Material, FKC Co. Ltd. Accessed Jul. 30, 2015 at http://www.fkcscrewpress.com/docs/fkcbiosolids2.pdf.
Screw Press Operating Hints (CC Series), Vincent Corporation. Accessed May 31, 2012 at http://www.vincentcorp.com/screw_press_operating_hints_%28cp%20series%29.
Stillage Dewatering Screw Press, Promotional Material, FKC Co. Ltd. Accessed Jul. 30, 2015 at http://www.fkcscrewpress.com/docs/spentgrain_stillageflyerweb.pdf.
Australian Patent Exam Report from Australian Patent Application No. 2009236328 dated Jul. 2, 2013.
Japanese Office Action from 2011-505140 dated Jan. 7, 2014.
Second Australian Patent Exam Report from 2009236328 dated Jan. 30, 2014.

(56) References Cited

OTHER PUBLICATIONS

Belmares H. et al. New Rubber Peptizers and Coatings Derived from Guayule Resin, Industrial and Engineering Chemistry: Product Research and Development, vol. 19, pp. 107-111 (1980).
Schloman, W. W. Jr. et al., Guayule Byproduct Evaluation: Extract Characterization, J. Agricultural and Food Chemistry, vol. 31, pp. 873-876 (1983).
Schloman, W. W. Jr. et al., Rubber Additives Derived from Guayule Resin, Industrial and Engineering Chemical Research, vol. 27, pp. 712-716 (1988).
Kim, Dong Seok, International Search Report with Written Opinion from PCT/US2013/046380, 12 pp. (dated Oct. 9, 2013).
Notice of allowance issued in U.S. Appl. No. 12/937,284 dated Apr. 16, 2014.
Notice of Allowance issued in U.S. Appl. No. 14/338,581 dated Aug. 30, 2016.
Non-final Office Action issued in U.S. Appl. No. 14/338,581 dated Feb. 3, 2016.
Response filed in U.S. Appl. No. 14/338,581 dated Apr. 19, 2018.
Notice of Allowance issued in U.S. Appl. No. 14/338,581 dated May 2, 2016.
RCE filed on Aug. 2, 2016 in U.S. Appl. No. 14/338,581.
Non-final office action issued in U.S. Appl. No. 15/384,527 dated Feb. 13, 2018.
Response filed in U.S. Appl. No. 15/364,627 dated May 14, 2018.
Examination report issued in application No. AU2013230936 (dated Feb. 26, 2016).
Response filed on May 16, 2016 in application No. AU2013230936).
Examination report issued in application No. AU2016222428 (dated Jan. 2017).
Response filed in Aug. 2017 in AU application 2016222428.
Response filed Apr. 22. 2016 in AU application 2013230935.
Examination report issued in application No. AU2013230935 (dated Feb. 25, 2016).
Examination report issued in application AU2016213719 (dated Jan. 2017).
Response filed in application AU2016213719 dated Mar. 2017.
Office Action issued in application No. CN201380021313.9 (dated Jan. 18, 2016).
Fourth Office Action issued in application No. CN2013-80023740.0 (dated Oct. 2016).
Decision of Rejection issued in application No. CN2013-80023740.0 (dated May 2017).
Third Office Action dated May 2016 in CN application 201380023740.0.
Response submitted in application No. EP13758291 2 (filed Apr. 14, 2016).
European Search Report in EP application (16205645), dated May 11, 2017.
Response submitted in appliation No. EP16205645 dated Dec. 7, 2017.
Grant notice issued in application No. EP16205645 dated Mar. 23, 2018.
Response submitted in application No. EP13757665.8 (filed Apr. 14, 2016).
European Search Report and Opinion in EP application 17168837, dated Jun. 30, 2017 and May 29, 2017.
Response submitted in application No. EP17186837.7 dated Mar. 13, 2018.
Office action issued in RU application No. 2014140181 dated Feb. 14, 2017.
Office action issued in RU application No. 2014140183 dated Feb. 10, 2017.
Office action dated May 4, 2016 in U.S. Appl. No. 14/383,379.
Response filed Jul. 31, 2015 in U.S. Appl. No. 14/383,379.
Notice of Allowance dated Aug. 19, 2015 in U.S. Appl. No. 14/383,379.
Notice of allowanced dated Feb. 29, 2016 in U.S. Appl. No. 14/383,379.
Final Office Action dated Jul. 21, 2016 in U.S. Appl. No. 14/383,380.
Response dated Sep. 1, 2016 in U.S. Appl. No. 14/383,380.
Notice of allowance dated Dec. 27, 2017 in U.S. Appl. No. 14/383,380.
Response dated Jul. 7, 2016 in U.S. Appl. No. 14/383,380.
Office action dated Apr. 12, 2016 in U.S. Appl. No. 14/383,380.
Office action dated Jul. 29, 2016 in U.S. Appl. No. 15/130,050.
Response filed Oct. 13, 2016 in U.S. Appl. No. 15/130,050.
Notice of allowance dated Nov. 21, 2016 in U.S. Appl. No. 15/130,050.
Non-final office action rejection from U.S. Appl. No. 15/477,152 dated Jun. 28, 2017.
Response filed Sep. 28, 2017 in U.S. Appl. No. 15/477,152.
Notice of allowance dated Oct. 6, 2017 in U.S. Appl. No. 15/477,152.
Allowance dated Sep. 23, 2016 in AU application 2013262725.
Examination report dated Mar. 2016 in AU application 2013262725.
Response filed in AU application 2013262725 (dated Aug. 10, 2016).
Second examination report dated Aug. 23, 2016 in AU application 2013262725.
Response filed in AU application 2013262725 (dated Sep. 12, 2016).
Examination reported issued in AU application 2017200069 dated Aug. 2017.
Response submitted in AU application 2017200069 dated Mar. 2018.
Grant notice issued in AU application 2017200069 dated Apr. 2018.
Third Office Action issued in CN application 201380031854.X (dated Dec. 6, 2016).
Second Office Action issued in CN application 201380031854.X. (dated May 13, 2016).
Response filed in application EP13792144.0 dated Aug. 30, 2016.
Supplemental Search Report and opinion dated May 2016 in application EP 13792144.0.
Office action issued in RU application 2014150798 dated Apr. 5, 2017.
Non-final office action from U.S. Appl. No. 14/401,749, dated Aug. 24, 2017.
Response filed in U.S. Appl. No. 14/401,749 dated Nov. 2017.
Notice of allowance issued in U.S. Appl. No. 14/401,749 dated Mar. 2018.
Allowance dated Aug. 2018 in AU application 2013277296.
Examination report dated May 2016 in AU application 2013277296.
Response filed Jul. 1, 2016 in AU application 2013277296.
Second office action from application CN201380032071.3, dated Aug. 29, 2017.
First office action from application CN201380032071.3, dated Feb. 7, 2017.
Supplemental Search Report and opinion dated Feb. 2016 in EP application 13807874.2.
Response submitted Jul. 12, 2016 in EP application 13807874.2.
Office action issued in RU application 2015101234 dated Mar. 29, 2017.
Notice of allowance dated Oct. 2016 in U.S. Appl. No. 14/409,132.
Notice of allowance dated May 2016 in U.S. Appl. No. 14/409,132.
Notice of allowance dated Feb. 27, 2018 in U.S. Appl. No. 15/424,224.
Allowance dated Aug. 2016 in AU application 2013277335.
Examination report dated May 2, 2016 in AU application 2013277335.
Response submitted Jul. 1, 2016 in AU application 2013277335.
Third Office Action dated Nov. 2016 in CN application 201380032039.5.
Second Office Action dated May 2016 in CN application 201380032039.5.
Supplemental Search Report and opinion dated Feb. 2016 in EP application 13806430.8.
Response filed Jun. 23, 2016 in EP application 13806430.8.
Non-final rejection issued in U.S. Appl. No. 14/409,117 dated Jan. 25, 2018.
Response filed in U.S. Appl. No. 14/409,117 dated Apr. 25, 2018.
Allowance dated Jun. 2016 in AU application 2013277286.
Examination Report dated Feb. 2016 in AU application 2013277286.
Response filed May 2016 in AU application 2013277286.
Examination report dated Jun. 2017 in AU application 2016235014.

(56) References Cited

OTHER PUBLICATIONS

Third Office Action issued in application No. CN2013-80032056.9 (dated Nov. 2016).
Second Office Action dated May 2010 in CN application 201380032056.9.
Grant notice dated Sep. 2016 in EP application 13607611.2.
Response filed May 19, 2016 in EP application 13807611.2.
Search report from EP application 17152493.7 dated May 2017.
Response filed in EP application No. 17152493.7 dated Oct. 16, 2017.
Grant notice dated Jan. 2018 in EP application No. 17152493.7.
Office action issued in application RU2015101287, dated Apr. 2017.
Office action issued in application RU2015101287, dated Jul. 2017.
Non-final office action issued in U.S. Appl. No. 14/409,124 dated Jan. 25, 2018.
Response filed in U.S Appl. No. 14/409,124 dated Apr. 25, 2018.
Final Office Action from U.S. Appl. No. 14/483,455, dated Sep. 16, 2016.
Response filed in U.S Appl. No. 14/483,455 dated Sep. 22, 2016.
Notice of Allowance issued in U.S. Appl. No. 14/483,455 dated Sep. 29, 2016.
Office Action from U.S. Appl. No. 14/483,455, dated Apr. 27, 2016.
Response filed in U.S. Appl. No. 14/483,455 dated Aug. 26, 2016.
Third party submission including statements of relevance submitted in U.S. Appl. No. 15/430,938 on Aug. 24, 2017.
International Search Report with Written Opinion from PCT Application No. PCT/US2014/055086, dated Feb. 5, 2015.
Agricultural Encyclopedia of China (Volume of Crops), vol. one, compiled by Editorial Dept form Agricultural Encyclopedia of China, pp. 719-720. China Agricultural Press, Apr. 1991.
International Products Brochure 2007.
Abstract—Week 200365 Thomson Scientific. London, GB: AN 2003-682828. XP000002567182. JP 2003 040902 A (Nitlo Decko Corp) (dated Feb. 13, 2003).
Beintema, Nienke, Rubber From Dandelions and Shrubs, Wageningen World, No. 1, pp. 16-17, 2012.
Buranov, Anvar U. et al., Extraction and Characterization of Latex and Natural Rubber from Rubber-Bearing Plants, J. Agric. Food Chem. 2010, 58. 734-743.
Keller. B.A., editor, Rubber and Rubber-Plants (book), pp. 408-410, published 1936.
Kuester, J.L., Liquid Hydrocarbon Fuels From Biomass (1981).
Presentation pages by Schloman, W.W., Jr. undated (submitted via third party observations in PCT/US2013/041422 on Aug. 6, 2014).
Reynolds, Cynthia, "The Russians Are Coming," www2.macleans.ca/2011/08/11/the-russians-are-coming, Aug. 11, 2011.
Subramaniam, A., J Rubb. Res. Inst. Malaysia 25(2), 61-68; estimation of Aldehyde Groups in Natural Rubber with 2.4-dinitrophenylhydrazine (1977).
Van Beillen, Jan B, et al., "Guayule and Russian dandelion as alternative sources of natural rubber," CRC Critical Reviews in Biotechnology, CRC Press, vol. 27, No. 1, Jan. 2007, pp. 217-231.
Vincent Corporation, Screw Press Operating Hints, Sep. 17, 2009.

* cited by examiner

US 10,138,304 B2

METHODS FOR INCREASING THE EXTRACTABLE RUBBER CONTENT OF NON-*HEVEA* PLANT MATTER

BACKGROUND

The *Hevea* plant or tree (also called *Hevea brasiliensis* or a rubber tree) is a well-known source of natural rubber (also called polyisoprene). Rubber sources such as *Hevea brasiliensis*, *Ficus elastica* (India rubber tree) and *Cryptostegia grandiflora* (Madagascar rubbervine) produce natural rubber in the form of a sap where the rubber is suspended in an aqueous solution that flows freely and can be recovered by tapping of the plant. Various non-*Hevea* plants are also known to contain natural rubber, but their rubber is stored within the individual cells of the plant (e.g., stems, roots or leaves) and cannot be accessed by tapping but can only be accessed by breaking down the cell walls by physical or other means.

SUMMARY

Provided herein are methods for increasing the extractable rubber content of non-*Hevea* plant matter. The methods comprise the use of particular forms of hammer milling and/or roller milling and result in an increase in the amount of rubber that can be extracted from the resulting plant matter such as by organic solvent extraction or aqueous extraction.

In a first embodiment, a method for increasing the extractable rubber content of non-*Hevea* plant matter without unduly increasing the extractable resin content is provided. The method comprises utilizing a quantity of chopped non-*Hevea* plant matter having an average length of ½" to 4" and a maximum moisture content of about 15 weight % and subjecting the chopped non-*Hevea* plant matter to at least one of hammer milling utilizing a screen size of less than ½" and roller milling with corrugated rolls having no more than 12 grooves per inch, thereby producing a quantity of milled non-*Hevea* plant matter. The milled non-a maximum moisture content of about 15 weight %, an extractable rubber content at least 30% higher than the pre-milled chopped non-*Hevea* plant matter.

In a second embodiment, a method for increasing the extractable rubber content of guayule shrub plant matter without unduly increasing the extractable resin content is provided. The method comprises utilizing a quantity of chopped guayule shrub having an average length of ½" to 4" and a maximum moisture content of about 15 weight % and subjecting the chopped guayule shrub plant matter to hammer milling utilizing a screen size of less than ½"; optionally roller milling with corrugated rolls having no more than 12 grooves per inch, and flake milling, thereby producing a quantity of milled guayule shrub plant matter. The milled guayule shrub plant matter has a maximum moisture content of about 15 weight %, an extractable rubber content at least 100% higher than the pre-milled chopped guayule shrub plant matter and an extractable resin content no more than 3 times the extractable rubber content.

DETAILED DESCRIPTION

The methods provided herein relate to increasing the extractable rubber content of non-*Hevea* plant matter. The methods comprise the use of particular forms of hammer milling and/or roller milling and result in an increase in the amount of rubber that can be extracted from the resulting plant matter such as by organic solvent extraction or aqueous extraction.

Definitions

The terminology as set forth herein is for description of the embodiments only and should not be construed as limiting the invention as a whole.

As used herein, the term non-*Hevea* plant is intended to encompass plants that contain natural rubber within the individual cells of the plant.

As used herein the term "plant matter" means material obtained from a non-*Hevea* plant. Unless otherwise specified, the plant matter may include roots, stems, bark, woody material, pith, leaves and dirt.

As used herein the term "resin" means the naturally occurring non-rubber chemical entities present in non-*Hevea* plant matter, including but not limited to resins (such as terpenes), fatty acids, proteins, and inorganic materials.

The Methods

In a first embodiment, a method for increasing the extractable rubber content of non-*Hevea* plant matter without unduly increasing the extractable resin content is provided. The method comprises utilizing a quantity of chopped non-*Hevea* plant matter having an average length of ½" to 4" and a maximum moisture content of about 15 weight % and subjecting the chopped non-*Hevea* plant matter to at least one of hammer milling utilizing a screen size of less than ½" and roller milling with corrugated rolls having no more than 12 grooves per inch, thereby producing a quantity of milled non-*Hevea* plant matter. The milled non-a maximum moisture content of about 15 weight %, an extractable rubber content at least 30% higher than the pre-milled chopped non-*Hevea* plant matter and an extractable resin content of no more than 3 times the extractable rubber content.

In certain sub-embodiments according to the first embodiment, the non-*Hevea* plant matter is from guayule shrubs. Thus, disclosed and discussions contained herein that are directed to the first embodiment should be understood to apply equally to this sub-embodiment of the first embodiment, unless indicated otherwise.

In a second embodiment, a method for increasing the extractable rubber content of guayule shrub plant matter without unduly increasing the extractable resin content is provided. The method comprises utilizing a quantity of chopped guayule shrub having an average length of ½" to 4" and a maximum moisture content of about 15 weight % and subjecting the chopped guayule shrub plant matter to hammer milling utilizing a screen size of less than ½"; optionally roller milling with corrugated rolls having no more than 12 grooves per inch, and flake milling, thereby producing a quantity of milled guayule shrub plant matter. The milled guayule shrub plant matter has a maximum moisture content of about 15 weight %, an extractable rubber content at least 100% higher than the pre-milled chopped guayule shrub plant matter and an extractable resin content no more than 3 times the extractable rubber content.

As previously mentioned, the methods according to the first embodiment disclosed herein are utilized with plant matter from non-*Hevea* plants. Exemplary non-*Hevea* plants useful in those methods, include, but are not limited to: *Parthenium argentatum* (Guayule shrub), *Taraxacum Kok-Saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata*, et al (milkweeds), *Solidago altissima, graminifolia rigida*, et al (goldenrods), *Cacalia atripilicifolia* (pale Indian plantain), *Pycnanthemum incanum* (mountain mint), *Teucreum canadense* (American germander) and *Campanula Americana* (tall bellflower). Other plants which produce rubber and rubber-like hydrocarbons are known, particularly among the Compositae, Euphorbiaceae, Campanulaceae, Labiatae, and Moracea families. The plant matter that is processed according to the first and second embodiments of the methods disclosed herein, can be from one type of plant or a mixtures of more than one type of plant.

As previously discussed, in the first embodiments of the methods disclosed herein, the extractable rubber content of the milled plant material is at least 30% higher and in the second embodiment at least 100% higher than the extractable rubber content of the pre-milled chopped plant matter. In certain embodiments according to the first embodiments of the methods disclosed herein, the extractable rubber content of the milled plant material is at least 40% higher, at least 50% higher or even at least 60% higher than the extractable rubber content of the pre-milled chopped plant matter. In certain embodiments of the first embodiment of the methods disclosed herein, the extractable rubber content of the milled plant material is at least 30% higher and the extractable resin content is no more than 3 times, no more than 2 times or no more than 1.5 times higher than in extractable contents in the pre-milled chopped plant matter. In certain embodiments of the second embodiments disclosed herein, the extractable rubber content of the milled plant material is at least 100% higher and the extractable resin content is no more than 3 times, no more than 2 times, or no more than 1.5 times higher than the extractable contents of the pre-milled chopped plant matter. In certain embodiments according to the first embodiments of the methods disclosed herein, the extractable rubber content of the milled plant material is at least 40% higher, at least 50% higher or even at least 60% higher than the extractable rubber content of the pre-milled chopped plant matter. Exemplary methods for measuring the extractable rubber content and the extractable resin content of milled plant material are provided in the Examples.

In certain embodiments according to the first and second embodiments of the methods disclosed herein, the milled plant matter has an extractable resin content of no more than 3 times the extractable rubber content. In certain other embodiments according to the first and second embodiments of the method disclosed herein, the milled plant matter has an extractable resin content of no more than 2 times the extractable rubber content. In yet other embodiments according to the second embodiment of the methods disclosed herein, the milled plant matter has an extractable resin content of no more than 1.5 times the extractable rubber content. As illustrated in the Examples provided, herein, it is believed that the use of flake milling in combination with hammer milling and roller milling allows for an increase in extractable rubber content without an unduly commensurate increase in extractable resin content (as compared to hammer milling and roller milling alone). As used herein, the phrase without unduly increasing the extractable resin content is used to refer to an increase in extractable rubber content of a given plant material that is higher than the commensurate increase in extractable resin content of that plant material (e.g., extractable rubber content increases by 50%, but extractable resin content only increases by 20%), each as compared to extractable contents on pre-milled chopped plant material. In certain embodiments according to the first and second embodiments disclosed herein, the methods can be understood as resulting in a preferential (or larger) increase in extractable rubber content as compared to any increase in extractable resin content. It certain instances, it may be preferable to increase the extractable rubber content without unduly increasing the extractable resin content.

In certain embodiments according to the first embodiment of the methods disclosed herein, the non-*Hevea* plant matter is obtained from at least one of: *Parthenium argentatum* (Guayule shrub), *Taraxacum Kok-Saghyz* (Russian dandelion), *Euphorbia lathyris* (gopher plant), *Parthenium incanum* (mariola), *Chrysothamnus nauseosus* (rabbitbrush), *Pedilanthus macrocarpus* (candililla), *Asclepias syriaca, speciosa, subulata*, et al (milkweeds), *Solidago altissima, graminifolia rigida*, et al (goldenrods), *Cacalia atripilicifolia* (pale Indian plantain), *Pycnanthemum incanum* (mountain mint), *Teucreum canadense* (American germander) and *Campanula Americana* (tall bellflower). In certain preferred embodiments according to the first and second embodiments of the methods disclosed herein, the non-*Hevea* plant matter is obtained from guayule shrub (*Parthenium argentatum*).

According to the first and second embodiments of the methods disclosed herein, the plant matter that is utilized has been chopped. In certain embodiments, the plant matter comprises chopped guayule shrub including bark and woody tissue from the shrub but with no more than 5 weight %, preferably no more than 4 weight % or no more than 3 weight % or even more preferably no more than 1 weight % of the plant matter comprising leaves from the guayule shrub. In certain of the foregoing embodiments, the chopped guayule shrub used initially comprises both the above-ground portions and below-ground portions of the shrub (i.e., the stems (with bark, woody tissue and pith) and the roots). In other of the foregoing embodiments, the guayule shrub used comprises only the above-ground portions of the shrub (in other words, the roots are not included in the plant matter). The leaves of the guayule shrub may be removed using various methods such as field drying followed by shaking. Other methods for removing the leaves from the guayule shrub may be utilized as the particular method for removing leaves is not considered to be a significant limitation of the processes disclosed herein. In certain embodiments where the plant matter comprises guayule shrub, the shrubs are harvested by removing the entire plant (with roots intact) and allowing it to dry in the field to a water content of no more than 15 weight %, preferably no more than 12 weight % or even no more than 10 weight % water.

As previously discussed, the chopped plant matter or chopped guayule shrub plant matter that is processed according to the methods of the first and second embodiments disclosed herein has a maximum moisture content of no more than about 15 weight % (based on the total weight of the chopped plant matter). As used herein, the term no more than about 15 weight % moisture should be understood to include moisture contents of 20 weight % and less, 15 weight % and less, including 5-20 weight % moisture, 5-15 weight % moisture, 10-15 weight % moisture and 10-20 weight % moisture. In other embodiments according to the first and second embodiments disclosed herein, the chopped plant matter or chopped guayule shrub plant matter has a maximum moisture content of 12 weight % or even a maximum moisture content of 10 weight %. The moisture content includes the water content in addition to any organic solvents that may be been added to the chopped plant matter or chopped guayule plant matter. Preferably, the chopped plant matter or chopped guayule shrub plant matter that is processed according to the methods of the first and second embodiments disclosed herein contains no added organic solvent and, thus, its "moisture content" is the result of residual water present from the harvested plant matter or guayule shrub material.

In certain embodiments of the first and second embodiments of the methods disclosed herein, the plant matter utilized in the slurry has been chipped or chopped into pieces with an average size of 1" or less. (Unless indicated to the contrary, the terms chipping and chopping, and various forms of each, are used interchangeably herein.) The chipping or chopping may take place in one or more than one step. For example, the non-*Hevea* plant that is utilized may be rough chopped at the location of harvesting into pieces averaging less than 2" in length. Alternatively, the non-*Hevea* plant that is utilized may be rough chopped into pieces of about 3" in length. Rough chopping may take place before or after the optional removal of leaves and soil (such as by shaking the plant or subjecting it to strong air currents), but is preferably after the removal of a large majority of leaves and soil from the harvested plant matter. Chipping or chopping into pieces with an average size of 1.5" or less or 1" or less may be achieved using various physical means. One exemplary way of obtaining chopped plant matter with an average size of 1.5" or less or 1" or less is to feed raw plant material (or optionally rough chopped plant matter) into a shredder, granulator, a hammer mill, or a roller mill.

A granulator is a well-known machine designed for chopping or grinding material in various sizes. Most granulators contain multiple knives (often steel knives) and one or more screens (sometimes interchangeable) with various diameter holes to determine the size of the final product. Various granulators exist and may be useful in chopping the plant matter such as those containing openings of ⅜", ¼" and ⅛".

As previously discussed, certain embodiments of the first embodiment and the processes of the second embodiment of the methods disclosed herein utilize a hammer mill. A hammer mill can generally be described as a steel drum containing a vertical or horizontal rotating shaft or drum on which hammers are mounted along with a surrounding screen-like material on the outer surface; the hammers "pound" the material that is passed through the mill. The hammers are generally flat metal bars often with some type of hardface treatment on the working ends. The hammers may be fixed or swinging. As the processed material passes through the screen openings, the size of the screen openings directly determines the final particle size of the hammer milled material.

Those embodiments of the first and second embodiments of the methods disclosed herein where a hammer mill is utilized, utilize a hammer mill having a screen with openings of less than ½" in size (i.e., a screen size of less than ½"). In certain embodiments, the screen of the hammer mill has openings of ⁷⁄₁₆", ⅜", ⁵⁄₁₆", ¼", ³⁄₁₆", ⅛" or ¹⁄₁₆" In other embodiments, the screen of the hammer mill has openings of ¹⁵⁄₃₂", ⁷⁄₁₆", ¹³⁄₃₂", ⅜", ¹¹⁄₃₂", ⁵⁄₁₆", ⁹⁄₃₂", ¼", ⁷⁄₃₂", ³⁄₁₆", ⁵⁄₃₂", ⅛", ³⁄₃₂", ¹⁄₁₆" or ¹⁄₃₂".

As previously discussed, certain embodiments according to the first and second embodiments disclosed herein utilize a roller mill. A roller mill/cracker mill can generally be described as a device with two or more rolls (configured in pairs) each containing longitudinal grooves which assist in further size reduction of material fed through the mill. Various size roller mills exist with the length and diameter of the rolls varying and the rolls also being available with various types of corrugation configurations. The corrugation configurations of the rolls are either referred to in terms of corrugations or grooves per inch (e.g., 6 grooves per inch, 8 grooves per inch) or by the opening size of the grooves (e.g., ¾", ½", ⅜", ¼" and ⅛"). Some rolls contain horizontal grooves (i.e., the grooves are parallel to the axis of rotation) and other rolls contain offset grooves (i.e., the grooves are offset from the axis of rotation by various degrees such as 5°). Furthermore, various profiles exist for the grooves, including round bottom vee (RBV), flat bottom vee, sawtooth with different leading and trailing angles, LePage cut with one roll corrugated longitudinally and one corrugated circumferentially, etc. The size and profile of the grooves (i.e., the width and shape of the openings) determines the final size and shape of the roller milled material.

Those embodiments of the first and second embodiments of the methods disclosed herein where a roller mill is utilized, preferably utilize one pass through a roller mill set-up. In certain embodiments, the roller mill is configured with rolls that each have no more than 12 grooves per inch. Such a configuration may entail various set-ups including the use of two rolls each with 8 grooves per inch, two rolls each with 6 grooves per inch, one roll with 8 grooves per inch utilized with a second roll with 6 grooves per inch, two rolls each with 10 grooves per inch, two rolls each with 12 grooves per inch, one roll with 10 grooves per inch utilized with a second roll with 12 grooves per inch, etc. In other embodiments of the first and second embodiments of the methods disclosed herein, the roller mill is configured with rolls that each have no more than 8 grooves per inch. In certain of the foregoing embodiments of the first and second embodiments of the methods disclosed herein, the roller milling utilizes one pass through the rolls. In yet other embodiments of the first and second embodiments of the methods disclosed herein, the roller milling utilizes one pass through the rolls with a first roll having 6 grooves per inch and a second roll having 8 grooves per inch and the extractable rubber content is increased by at least 60%. The corrugations on each roll may be horizontal or offset. Various profiles may be used for the grooves on each roll, including, but not limited to RBV and straight profile.

In certain embodiments according to the first embodiment and processes according to the second embodiment disclosed herein, the plant matter that has been hammer milled and roller milled is also subjected to flake milling prior to processing for extraction of rubber. A flaker mill or flaker can generally be described as a device with two or more rolls each having a smooth surface, usually operated at different speeds, with a defined and adjustable clearance between rolls which primarily assist in providing further rupturing of plant cell walls. This type of mechanical treatment tends to increase the amount of natural rubber that can ultimately be recovered from the plant matter. In certain embodiments according to the first and second embodiments disclosed herein, the flake milling comprises one pass through a flaker. In other embodiments according to the first and second embodiments disclosed herein, the flake milling comprises multiple passes through a flaker, such as two passes, three passes or more. In those embodiments where at least one of roll milling, hammer milling, shredding, granulating or flake milling is used on the plant matter, the processed plant matter is preferably treated with at least one antioxidant if it will be stored prior to extraction of the rubber.

In certain embodiments according to the first and second embodiments of the methods disclosed herein, it can be helpful to treat the plant matter to remove undersize material at one or more stages. The plant matter may be treated to remove undersize material after chopping (i.e., prior to hammer milling or roller milling), after either hammer milling or roller milling or after each of hammer milling and roller milling. The amount of undersize material that is generated may vary depending upon various factors including the method that has been used to chop the plant material and the speed at which the chopping takes place. One exemplary way of removing undersize material is to pass the plant matter over a mesh screen that is then vibrated to allow undersize material to fall through the mesh. Various types of mesh screen may be utilized, depending upon the size of material that is classified as "undersize." In certain embodiments, a 30 mesh, 25 mesh, 20 mesh, 18 mesh or 16 mesh screen is utilized. The mesh rating of the screen corresponds to the number of openings per square inch. Hence a 20 mesh screen will have 20 openings in one square inch. The sizes of the openings in the listed mesh screens are as follows: 30 mesh (0.0232" openings or 595 micron openings); 25 mesh (0.0280" openings or 707 micron openings); 20 mesh (0.0331" openings or 841 micron openings); 18 mesh (0.0394" openings or 1000 micron openings); and 16 mesh (0.0469" openings or 1190 micron openings). Another exemplary way to remove undersize material is by using an air separator which functions to blow away or out undersize (and hence lighter) particles. Preferably when undersize material is removed (such as by a mesh screen), at least 90% by weight, even more preferably at least 95% by weight of the undersize material is removed. In certain embodiments according to the first and second embodiments disclosed herein, the plant material is processed prior to rubber extraction such that the plant material has a size of 1/16" to 1.5", preferably 1/16" to 1", even more preferably 1/8" to 1/2"; in certain such embodiments, the plant material has been subjected to a process such as granulation that utilizes a screen having openings of 1/16", 1/8", 1/4" or 1/2" thereby producing a material having a maximum size of no bigger than the openings.

EXPERIMENTS

Example 1

A quantity of plant material was obtained from guayule shrubs that were almost 7 years old by harvesting the plants above the roots. Noticeably dead plants were not harvested, but some dead branches (estimated at about 5% by weight) were likely included. No operation was performed to remove leaves, but because of the time of harvest, spring regrowth of new leaves had not yet begun. Leaf weight (dry basis) was estimated to be less than 20%. The harvested plant matter was field dried for 10 days. Thereafter, the harvested plant matter was subjected to a coarse chopping process (using a chipper) to produce stick-like plant matter pieces with a diameter of 0.25" (0.64 cm) to 0.125" (0.31 cm) and an average length of about 1.75" (4.45 cm). Approximately two weeks thereafter, the chopped material was passed over a 20 mesh vibrating screen to remove undersize particles. About 7 weight % of the chopped material was −20 mesh. The plant material retained on the 20 mesh screen was then subjected to either hammer milling or roller milling in order to rupture the rubber-containing cells of the plant material. After hammer milling or roller milling, the plant material was again subjected to a 20 mesh (0.841 mm) vibrating screen to remove undersize particles. All −20 mesh materials were ultimately combined (regardless of equipment utilized) and a sample of the combined material was analyzed for moisture, rubber and resin content. In total, about 15 weight % of the original material was −20 mesh.

Two different screen sizes were evaluated for the hammer milling operation: 3/16" (0.5 cm) screen and 1/2" (1.2 cm). The hammer milling machine was a Roskamp Champion, 22" Challenger model (manufactured by CPM Roskamp Champion, Waterloo, Iowa) with a 30 horsepower motor and variable control settings for the hammer tip speed. The hammer mill was set at a tip speed to simulate a 44" hammer mill and operated at about 3600 rpm. The roller milling machine was a Roskamp Champion model TP 900-12 (manufactured by CPM Roskamp Champion, Waterloo, Iowa) equipped with three pairs of corrugated rolls (the rolls are each 9" in diameter and 12" in length). For the roller milling, two settings were evaluated. The first setting involved a one-time pass through a 6-8 corrugated roll set-up with two different rolls (one roll having 6 corrugations per inch and the second having 8 corrugations per inch). In this set-up, the first roll was corrugated with a 5° spiral curve and the second roll contained straight corrugations. The grooves of both rolls had a RBV profile (round bottom V shaped). The second setting involved a two-pass operation. The first pass was through a 10-12 corrugated roll set-up with two different rolls (one roll having 10 corrugations per inch and the other having 12 corrugations per inch, both having RBV grooves, one horizontal and the other 5° offset). The second pass was through the 6-8 corrugated roll set-up previously described.

Samples of the hammer milled and roller milled plant material were analyzed by hexane/acetone co-solvent extraction by the procedure in the next paragraph to determine the amounts of rubber and resin contained therein. Moisture content of the samples of plant material was determined by weighing samples of the plant material before and after drying at 110° C. in a forced-air oven for 5 hours. Results are reported in Table 1, below. Additionally, in order to determine the amount of rubber and resin lost as a result of using the 20 mesh vibrating screen, an adjusted calculation (using the amount of rubber and resin found in the combination of all −20 mesh material and the relative amounts lost during each milling operation) was made of the amounts of rubber, resin and moisture in the milled material product by each milling operation. Results of the adjusted calculations are reported in Table 2, below.

The plant material was then mixed (in a sealed 5-gallon plastic bucket) with a co-solvent mixture (containing 79:21 w/w of hexane:acetone). In each 5-gallon bucket, 5 pounds shrub material (2.27 kg), 12.6 pounds hexane (5.72 kg) and 3.4 pounds acetone (1.54 kg) were utilized. The mixtures were allowed to soak at room temperature occasional shaking for varying amounts of time from 24 hours to 2 weeks. After soaking, large shrub particles had gravity settled to the bottom of the bucket, allowing the top liquid phase to be decanted away. The top liquid phase was then subjected to two rounds of centrifuging. The centrifuge utilized was a bowl type with a swing-bucket rotor, operated at about 1000 rpm for about 45 minutes for each round. After each round of centrifuging, the clear supernatant was passed through a 45 micron screen. Additional acetone (in an amount of approximately 1:1, v/v of acetone:screened liquid) was then added to the screened liquid to cause the rubber to coagulate. The coagulated rubber was collected by decanting the liquid away. The rubber pieces were then redissolved in about 0.5 gallons of a mixture of hexane and acetone (79:21 w/w of hexane:acetone) and again coagulated by the addition of approximately 0.5 gallons more acetone. The coagulated rubber was again collected by decanting away the liquid and squeezing out excess solvent and then the rubber was vacuum oven dried about 15 hours at 65-70° C. After drying, the rubber was weighed and re-dissolved with 1 phr antioxidant in hexane. After dissolving and mixing, the mixture was poured onto a large flat surface in the fume hood and the solvent was allowed to evaporate. After the initial drying, the rubber was weighed, then re-dissolved in a hexane solution containing 1 phr antioxidant (Santoflex® 134PD). After re-dissolving and mixing, the mixture was poured onto a large flat surface in the fume hood and the solvent was allowed to evaporate.

TABLE 1

|  | Chopped plant material* | Hammer mill, 3/16" screen | Hammer mill, 1/2" screen | Roller mill 6-8 configuration | Roller mill 6-8 and 10-12 configuration | −20 mesh of all combined |
|---|---|---|---|---|---|---|
| Mean particle size (μm)[1] | 1809 | 837 | 1230 | — | 1305 | — |
| % moisture[2] | 15.45 | 14.96 | 15.31 | 14.44 | 14.84 | 14.13 |
| % rubber[3] | 2.12 | 3.15 | 2.54 | 3.54 | 2.74 | 4.15 |
| % resin[3] | 6.4 | 8.89 | 8.93 | 7.37 | 8.83 | 14.15 |

[1]Mean particle size was determined by sieve analysis.
[2]Percentage moisture was determined by weighing samples before and after drying for 5 hours at 110° C. in a forced air oven.
[3]Rubber and resin percentages reported are weight percentages of extractable rubber based upon the subjecting a sample of the respective plant material to a soxhlet-type extraction process with co-solvent of hexane and acetone (79:21, w/w hexane:acetone).

TABLE 2

|  | Hammer Mill 3/16" Screens | Hammer Mill 1/2" Screens | Roller mill 6-8 configuration | Roller mill 10-12 and 6-8 configuration |
|---|---|---|---|---|
| % Moisture | 14.88 | 15.19 | 14.42 | 14.77 |
| % Rubber | 3.25 | 2.70 | 3.57 | 2.87 |
| % Resin | 9.40 | 9.46 | 7.75 | 9.34 |

Samples of dried rubber obtained from guayule plant material that had been obtained as described above in paragraphs [00025]-[00028] were tested for molecular weight (using GPC, polystyrene standard) and for ash content (using thermogravimetric analysis "TGA"). The samples that were submitted for GPC and TGA analysis were taken from the vacuum dried rubber prior to re-dissolution and addition of antioxidant. (The rubber obtained from each of the roller milling and hammer milling treatments was combined together in no particular order, but, rather, as it was obtained such that there is no direct correspondence between Examples 1-5 of Table 3 and the examples that appear in Table 1.) For the TGA, a Q5000 model from TA Instruments was used with a standard heating protocol from room temperature to 550° C. and held for 4 hours. Results are reported in Table 3.

TABLE 3

|  | #1 | #2 | #3 | #4 | #5 |
|---|---|---|---|---|---|
| TGA residue, "ash" (weight %) | 0.12 | 0.15 | 0.25 | 0.21 | 0.03 |
| Molecular weight (×10[6]) | 1.21 | 1.36 | 1.48 | 1.33 | 1.40 |
| Mw/Mn | 3.36 | 3.51 | 4.10 | 3.92 | 3.99 |
| Acetone extractables (weight %) | 0.27 | 0.23 | 0.37 | 0.25 | 0.45 |

Example 2—Hammer Milling, Roll Milling/Cracking and Flaking (Flake Milling)

Guayule shrub approximately 8-36 months old was harvested and bundled into bales. The bales were measured to have a moisture content of about 20-25%. Bales were fed to a standard wood chipper to reduce the guayule material into approximately 1" sticks. The shredded sticks of guayule were fed through a hammer mill by hand for further size reduction. The hammer mill then air conveyed the milled shrub through a fan to a cyclone separator. Varied screen sizes for the hammer mill (1", 1/2", 1/8", and 1/16") were used. The milled shrub was collected in bins and weighed as it was being produced.

All of the shrub was processed through a Sweco screener with a 20 mesh screen. The screener was used to remove fines from the shrub. It was tested before and/or after milling.

The milled shrub was processed in a cracker (also known as a roller mill), set up to have a differential roll speed of 1:1.1. The roll spacing on the cracker was adjustable. The cracker was fed using a vibratory screen feeder and the cracked material was collected in bins.

The cracked material was transferred to a flaker. The flaker had its own roll feeder, a differential roll speed of 1:1.25 and the roll spacing was set at 0.012". Samples of the flaked material were taken and retained for cell rupture analysis and for initial shrub rubber content. Some of the flaked material was retained to be run through the flaker a second and a third time. The flaked material was collected in bins and weighed. The final flaked material was refrigerated until it was ready to be extracted.

Determination of the % rubber and resin in samples was made using 9-10 gram samples of guayule material, soxhlet extracting for 6 hours with co-solvent (31 mL acetone, 170 mL pentane) to solubilize rubber and resin. Solubilized rubber (contained within the pentane phase) was isolated using methanol coagulation, centrifuging and drying. More specifically, 20 mL of the extract from the soxhlet extraction was transferred to a centrifuge tube and 20 mL of methanol was added to coagulate the rubber. The tube and its contents was centrifuged at 1500 rpm for 20 minutes to separate coagulated rubber from solvent. The supernatant within the tube was decanted into a flask and reserved for % resin determination. The tube and its coagulated rubber contents were rinsed with an aliquot of acetone (10 mL) and the acetone was poured out of the tube into the flask containing the decanted supernatant. The remaining coagulated rubber within the tube was then placed into a vacuum oven that had been pre heated to 60° C. and dried under vacuum for 30 minutes. After cooling to room temperature, the tube was weighed and the amount of rubber therein was calculated. Resin content (contained within the acetone phase) was determined by utilizing the flask containing the supernatant and decanted acetone. The solvent was evaporated from the flask in a fume hood until near dryness. The remaining contents were then further dried by placing the flask into an oven at 110° C. for 30 minutes. After cooling, the flask was weighed and the amount of resin remaining in the flask was calculated. Results are provided in Table 4 below.

TABLE 4

| Conditions | Avg. % Moisture | Avg. % Rubber (Dry Weight Base) | Avg. % Resin (Dry Weight Base) |
|---|---|---|---|
| Shredded & Hammermilled ½" | 26.79 | 2.34 | 6.70 |
| Shredded & Hammermilled ⅛" | 22.29 | 3.12 | 6.78 |
| Shredded & Hammermilled ⅛" & 20 mesh screened & flaked | 19.67 | 4.98 | 6.96 |
| Shredded & Hammermilled ⅛" & 20 mesh screened & three passes flaked | 19.52 | 5.61 | 7.33 |

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See Bryan A. Garner, *A Dictionary of Modern Legal Usage* 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus, and illustrative examples shown and described. Accordingly, departures may be made from such details without departing from the spirit or scope of the applicant's general inventive concept.

What is claimed is:

1. A method for increasing the extractable rubber content of non-*Hevea* plant matter without unduly increasing the extractable resin content comprising:
   utilizing a quantity of chopped non-*Hevea* plant matter having an average length of ½" to 4" and a maximum moisture content of 15 weight % and subjecting the chopped non-*Hevea* plant matter to at least one of
      hammer milling utilizing a screen size of less than ½" and greater than or equal to 3/16"; and
      roller milling with corrugated rolls having no more than 8 corrugations per inch,
   thereby producing a quantity of milled non-*Hevea* plant matter having a maximum moisture content of 15 weight %, an extractable rubber content at least 30% higher than the pre-milled chopped non-*Hevea* plant matter and an extractable resin content of no more than 3 times the extractable rubber content.

2. The method according to claim 1, wherein the non-*Hevea* plant matter comprises guayule shrubs.

3. The method according to claim 2, wherein the milled guayule shrub plant matter has an extractable rubber content at least 100% higher than the pre-milled chopped guayule shrub plant matter.

4. The method according to claim 3, wherein the roller milling is not optional.

5. The method according to claim 1, wherein the milled non-*Hevea* plant matter has an extractable rubber content at least 40% higher than the pre-milled chopped non-*Hevea* plant matter.

6. The method according to claim 1, wherein the hammer milling utilizes a screen size of 5/16" to 3/16.

7. The method according to claim 1, wherein the roller milling utilizes corrugated rolls having no more than 8 grooves per inch and no less than 6 grooves per inch.

8. The method according to claim 1, wherein the roller milling utilizes one pass through the rolls.

9. The method according to claim 1, wherein the roller milling utilizes one pass through the rolls with a first roll having 6 grooves per inch and a second roll having 8 grooves per inch and the extractable rubber content is increased by at least 60%.

10. The method according to claim 1, wherein the chopped non-*Hevea* plant matter has an average length of less than 2" and contains no more than 1 weight % of material with a mesh size less than 20.

11. The method according to claim 1, wherein the milled non-*Hevea* plant matter is subjected to a particle size screening to remove at least 90 weight % of the particles having a size of less than 20 mesh prior to subjecting to a water-based or organic solvent based rubber extraction process.

12. The method according to claim 1, further comprising flake milling the milled non-*Hevea* plant matter.

13. The method according to claim 12, wherein the flake milling comprises multiple passes through a flaker.

14. The method according to claim 1, further comprising subjecting the milled non-*Hevea* plant matter to a screening process to remove undersize plant matter.

15. The method according to claim 14, wherein the undersize plant matter is less than 20 mesh.

16. A method for increasing the extractable rubber content of guayule plant matter without unduly increasing the extractable resin content comprising:
   utilizing a quantity of chopped guayule plant matter having an average length of ½" to 4" and a maximum moisture content of 15 weight % and subjecting the chopped guayule plant matter to at least one of
      hammer milling utilizing a screen size of less than ½" and greater than or equal to 3/16"; and
      roller milling with corrugated rolls having no more than 8 corrugations per inch,
   thereby producing a quantity of milled guayule plant matter having a maximum moisture content of 15 weight %, an extractable rubber content at least 30% higher than the pre-milled chopped guayule plant matter, and an extractable resin content of no more than 3 times the extractable rubber content.

17. The method according to claim 16, further comprising flake milling the milled guayule plant matter.

18. The method according to claim 16, further comprising subjecting the milled non-*Hevea* plant matter to a screening process to remove undersize plant matter having a size less than 20 mesh.

19. The method according to claim 16, wherein the roller milling utilizes corrugated rolls having no more than 8 grooves per inch and no less than 6 grooves per inch.

20. The method according to claim 16, wherein the roller milling utilizes one pass through the rolls with a first roll having 6 grooves per inch and a second roll having 8 grooves per inch and the extractable rubber content is increased by at least 60%.

\* \* \* \* \*